April 24, 1951

W. PARRISH ET AL 2,549,987

X-RAY DIFFRACTION METHOD

Filed March 27, 1948

WILLIAM PARRISH
EDWARD A. HAMACHER
INVENTORS

BY

AGENT

Patented Apr. 24, 1951

2,549,987

UNITED STATES PATENT OFFICE 2,549,987

X-RAY DIFFRACTION METHOD

William Parrish, Hastings, and Edward A. Hamacher, Irvington, N. Y., assignors to Philips Laboratories, Inc., Irvington on Hudson, N. Y.

Application March 27, 1948, Serial No. 17,398

6 Claims. (Cl. 250—52)

The invention relates to a method for analyzing a crystalline material by X-ray diffraction. More particularly, the invention is directed to a method of crystallographic analysis in which an incident beam of X-radiation is reflected from a crystalline specimen and angles of reflection are measured.

In the more specific sense, the invention is directed to an improvement in the "Bragg Focussing" technique which is well known in the art of X-ray diffraction studies and is fully described in the "Spectroscopy of X-rays" by Siegbahn (the English translation by Lindsay, published by the Oxford Press, 1925, page 20); in the "Chemical Analysis by X-rays and Its Applications" by Georg von Hevesy, published by MacMillan, 1932, in pages 22 et sequitur; and in Compton and Allison, "X-rays in Theory and Experiment," page 684, published by Van Nostrand. A detailed discussion of the Bragg focussing method is therefore believed unnecessary for the proper understanding of the invention.

However, the Bragg focussing method as described in any of the references has certain inherent limitations which the present invention overcomes. In particular, it is known that there is an apparent discrepancy introduced in the measurement of the Bragg reflection angle as a result of a too large divergence of the incident and reflected beams of radiation directed at and reflected from the specimen. If the divergence of the beam is limited in order to correct the discrepancy, the intensity of the beam is markedly reduced requiring longer exposure times.

With conventional focal spot arrangements, the Bragg focussing technique requires a beam of large divergence in the plane of the specimen axis in order to obtain sufficient intensity in the beam reflected by the specimen for energizing the detector, e. g., a Geiger-Müller tube. This large divergence thereby introduces a subsequent broadening of the reflected beam which results in the introduction of an error in the measured angle of the reflected beam, the Bragg angle $\theta$ and a decrease in the resolving power of the instrument.

It is therefore an object of the invention to provide a method employing the Bragg focussing technique which eliminates errors in the measurement of the Bragg angle, $\theta$.

It is a further object of the invention to provide a method employing the Bragg focussing technique wherein the divergence in the plane of the specimen axis is reduced without sacrificing the intensity of the X-ray beam.

It is a still further object of the invention to provide a method employing the Bragg focussing technique in which the intensity of the reflected beam is increased without sacrificing resolution.

These and further objects of the invention will appear from the description that follows.

According to the invention, a focal spot on the anode of an X-ray tube is viewed at very small angles along the width dimension in order to obtain a narrow source of radiation. For example, a focal spot 9 by 2 mms. wide is viewed along the 2 mms. dimension at an angle of approximately 3° with the anode surface whereby an effective focal spot having the dimensions 9 by 0.1 mms. is obtained whereas by viewing the focal spot along the length dimension for example, at 3° the focal spot would appear to have dimensions of .24 by 2 mms. wide. We prefer to employ a long, thin focal spot parallel to the specimen axis and which approaches a near line source. For ordinary Bragg focussing, the divergence in the X-ray beam in the plane of the specimen axis would impair resolution in the beam reflected from the specimen. However, in the method according to the invention, we are able to use this focal spot arrangement, and avoid excessive divergence in the plane of the axis of the specimen.

Between the focal spot and the specimen, we interpose a collimating system consisting of a plurality of thin parallel sheets oriented lengthwise along the beam of radiation and perpendicular to the specimen axis. This arrangement of sheets is commonly known as Soller slits and hereinafter we propose to refer to this collimating system as Soller slits.

The purpose of the Soller slits is in effect to break up the thin, long source of radiation into a series of focal spots, diverging effectively only in a plane perpendicular to the specimen axis, and having a limited divergence in the plane of the specimen axis. Thus, what we have done is to reduce a wide, diverging beam of radiation, having a divergence both in the plane of the specimen axis and in a plane perpendicular to the specimen axis into a series of parallel beams having a limited divergence in the plane of the specimen axis.

The resulting collimated beam after striking the specimen is reflected at the Bragg angle in the well-known manner and is thereafter collimated by a second system of Soller slits which similarly limit the divergence of the reflected beam in the plane of the specimen axis. The beam reflected at the Bragg angle after passing through the second system of Soller slits is selected by a receiving slit parallel to the axis of the specimen which has a width approximately equal to the projected focal spot and which is mounted on a goniometer for measuring angles of reflection from the specimen. After passing through the receiving slit, the beam is suitably detected, preferably by a Geiger-Müller tube.

In order that the invention may be more clearly understood and carried into effect, it will now be described with reference to the accompanying drawing in which.

Figure 1:
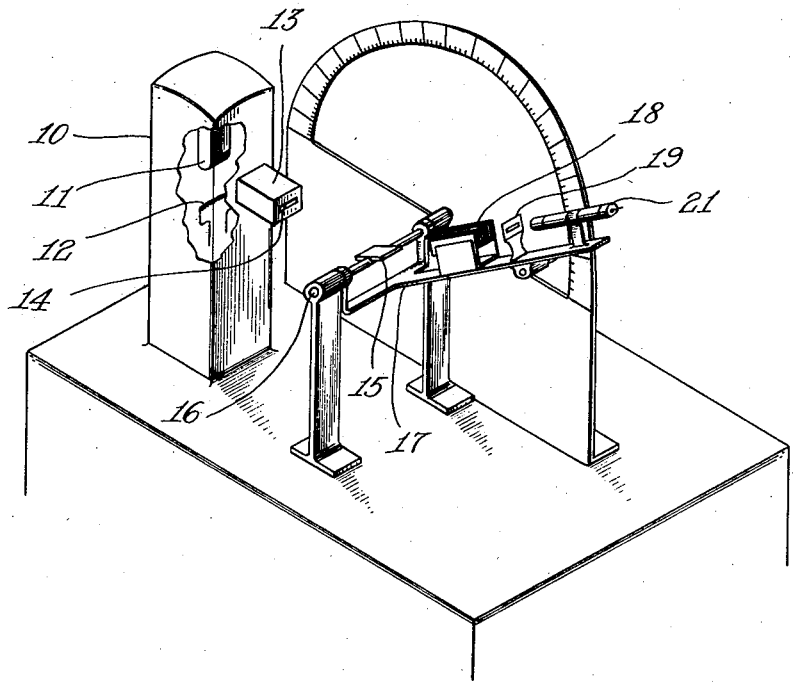
Fig. 1 illustrates a preferred embodiment of an apparatus employing the method according to the invention and is shown in perspective view with the X-ray tube partially in section.
Figure 2:
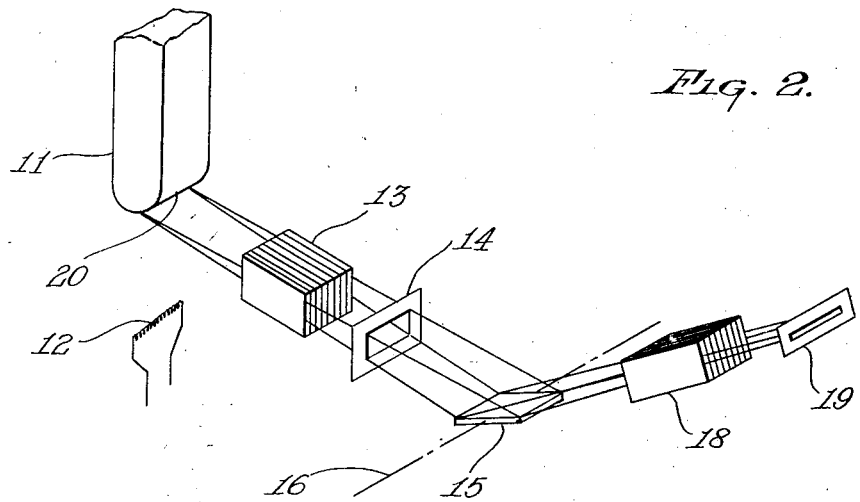
Fig. 2 is a perspective view of the geometry of the X-ray beam in a vertical plane illustrating the method according to the invention.

Referring to the drawing, a vertically mounted X-ray tube 10, (Fig. 1) in which the elements are arranged so that the cathode 12 is parallel to the face of anode 11 and produces a focal spot 20 lengthwise across the target face when viewed from the specimen 15. As is customary, the focal spot is viewed at low angles 1° to 3°, and preferably at an angle of 3° with the anode surface so that the focal spot appears effectively as a thin long line of radiation having the dimensions 9 mms. long by 0.1 mms. wide and emits a diverging cone of radiation (shown in section in Fig. 2). Between specimen 15 and the tube window, and preferably at the tube window, a Soller slit system is arranged to limit the divergence of the beam in the plane of the specimen axis 16 as can be seen in Fig. 2. As can also be seen, the original diverging beam is split into a plurality of parallel beams of radiation each emanating from a near point source on the anode; each beam diverging only in the plane perpendicular to the specimen axis. There will be a slight divergence in the plane of the specimen axis of each beam after emerging from the Soller slits, but this divergence is inconsequential since it is measurably below that obtained with ordinary Bragg focussing without Soller slits and with a near point source of radiation.

After emerging from the Soller slits, the beam is effectively a series of parallel beams of radiation diverging in the plane perpendicular to the plane of the specimen axis. However, in order to limit the width of the total beam in the plane perpendicular to the plane of the specimen axis to the width of the specimen, a divergence slit 14 is provided.

The specimen is mounted to rotate about its axis 16 in order to measure Bragg reflection angles which axis is parallel to the focal spot. Any conventional mounting arrangement which permits rotation of the specimen is suitable and the specimen is merely shown mounted in a holder arranged to rotate on a shaft carried on two stands.

After striking the specimen, the beam is reflected at the Bragg angle into a second Soller slit system 18 arranged for rotation about the axis of the specimen. The Soller slit system is carried on an arm 17 which is driven from the shaft carrying the specimen holder, and must be arranged to rotate at an angular speed twice that of the specimen. This second Soller slit system collimates the reflected beam in the same manner as the direct beam as can be clearly seen from Fig. 2 of the drawing.

After emerging from the second Soller slit system, the reflected beam is limited in width to the projected width of the focal spot by a receiving slit 19 mounted for convenience in measuring the Bragg reflection angles on a goniometer also mounted vertically and detected by Geiger-Müller tube 21.

The particular arrangement described is preferred because the basic geometry of the system permits reflection angles to be measured in the back reflection region, i. e. beyond 90° but the invention is equally applicable to horizontally mounted tubes and goniometers wherein in the angles in the back-reflection region cannot be conveniently measured.

As can be clearly seen, the invention overcomes the inherent limitation of the ordinary Bragg focussing method in that excessive divergence of the beam in the plane of the specimen axis is avoided. This excessive divergence has resulted in poor resolution in the reflected beam and false indications of the Bragg reflection angle. With our invention, these twin difficulties are obviated and the results have indicated from careful laboratory studies that there is a marked improvement in the resolution in the reflected beam and a truer indication of Bragg reflection angles.

However, we have found that in order to avail all the advantages inherent in this method, it is desirable to and necessary to employ a suitable detection instrument. For the purpose of the invention we have found a Geiger-Müller tube employing a mica window with a chlorine-argon filling both necessary and desirable. The mica window reduces the dead end volume and window loss to a minimum thus increasing the efficiency of the tube; the argon is suitable as a filling for the tube for high sensitivity and the chlorine increases the diameter of the sensitive region to utilize the full-length of the focal spot. In addition we have found it preferable to employ a mica window for the X-ray tube.

Since the divergence of the beam in the plane of the specimen axis is reduced by collimating the beam into a plurality of beams in the Soller slit, the total beam has a higher intensity than that ordinarily used in Bragg focussing technique. Hence, as result of the higher intensity, increased precision is obtained for X-ray diffraction studies to be made on crystalline powder specimens.

While we have illustrated our invention in a preferred embodiment of the apparatus, other forms of apparatus and variations of the method are within the skill and judgment of those skilled in the art without departing from the spirit and scope of our invention.

What we claim is:

1. A method of analyzing a crystalline material comprising the steps of generating a beam of X-radiation from a line source of X-radiation of given intensity, rotating a specimen of crystalline material about a given axis passing through the specimen and parallel to the line source of radiation, limiting the divergence of said beam in a plane containing the axis of rotation of the specimen to produce a virtual point source of radiation of like intensity as said line source of radiation, impinging the beam of limited divergence onto the specimen while rotating the specimen to obtain a reflected beam of radiation therefrom at a given angle of reflection with a plane perpendicular to the surface of the specimen, limiting the divergence of the reflected beam in the plane containing the axis of rotation, and detecting the reflected beam of radiation.

2. A method of analyzing a crystalline material comprising the steps of generating a beam of X-radiation from a line source of X-radiation of given intensity, rotating a specimen of crystalline material about a given axis passing through the specimen and parallel to the line source of radiation, collimating the beam of X-radiation while limiting the divergence of said beam in a plane containing the axis of rotation of the specimen to produce a plurality of beams of radiation of like intensity as said line source of radiation, impinging the collimated beam of limited divergence onto the specimen while rotating the specimen to obtain a reflected beam of radiation therefrom at a given angle of reflection with a plane perpendicular to the surface of the specimen, collimating the reflected beam into a plurality of beams while limiting the divergence of the reflected beam in the plane containing the axis of rotation, detecting the reflected beam of radiation, and measuring the angle of reflection of the reflected beam from the specimen.

3. X-ray diffraction apparatus comprising an X-ray tube for generating a line source of X-radiation, a first collimating system comprising a plurality of thin long parallel sheets impervious to X-radiation mounted perpendicular to said line source to collimate the beam of radiation into a plurality of parallel beams of radiation, means to mount a specimen of crystalline material for rotation about a given axis passing therethrough and parallel to the line source of radiation to reflect a beam of radiation therefrom, a second collimating system mounted for rotation with said specimen and comprising a plurality of thin long sheets impervious to X-radiation which are mounted perpendicular to said axis of rotation, and means to detect said reflected beam of radiation mounted for rotation with said specimen and said second collimating system whereby the reflected beam is detected and the intensity thereof determined.

4. X-ray diffraction apparatus comprising an X-ray tube for generating a line source of X-radiation, a first collimating system comprising a plurality of thin long parallel sheets impervious to X-radiation mounted perpendicular to said line source to collimate the beam of radiation into a plurality of parallel beams of radiation, means to mount a specimen of crystalline material for rotation about a given axis passing therethrough and parallel to the line source of radiation to reflect a beam of radiation therefrom, a second collimating system mounted for rotation with said specimen and comprising a plurality of thin long sheets impervious to X-radiation which are mounted perpendicular to said axis of rotation, means to detect said reflected beam of radiation mounted for rotation with said specimen and said second collimating system whereby the reflected beam is detected and the intensity thereof determined, and means to measure the angle of reflection of the reflected beam from the specimen.

5. X-ray diffraction apparatus comprising an X-ray tube for generating a line source of X-radiation, a first collimating system comprising a plurality of thin long parallel sheets impervious to X-radiation mounted perpendicular to said line source to collimate the beam of radiation into a plurality of parallel beams of radiation, means to mount a specimen of crystalline material for rotation about a given axis passing therethrough and parallel to the line source of radiation to reflect a beam of radiation therefrom, a second collimating system mounted for rotation with said specimen and comprising a plurality of thin long sheets impervious to X-radiation which are mounted perpendicular to said axis of rotation, a Geiger-Müller tube for detecting said reflected beam of radiation mounted for rotation with said specimen and said second collimating system whereby the reflected beam is detected and the intensity thereof determined, and a circular scale mounted perpendicular to the axis of rotation and slideably secured to the Geiger-Müller tube to permit relative movement of the latter over the scale for measuring angles of reflection of the reflected beam from the specimen.

6. X-ray diffraction apparatus comprising an X-ray tube for generating a line source of X-radiation, a first collimating system comprising a plurality of thin long parallel sheets impervious to X-radiation mounted perpendicular to said line source to collimate the beam of radiation into a plurality of parallel beams of radiation, means to mount a specimen of crystalline material for rotation about a given axis passing therethrough and parallel to the line source of radiation to reflect a beam of radiation therefrom, a second collimating system mounted for rotation with said specimen and comprising a plurality of thin long sheets impervious to X-radiation which are mounted perpendicular to said axis of rotation, means to limit the width of the collimated reflected beam of radiation to the projected width of the line source, a Geiger-Müller tube for detecting said reflected beam of radiation mounted for rotation with said specimen and said second collimating system whereby the reflected beam is detected and the intensity thereof determined, and a circular scale mounted perpendicular to the axis of rotation and slideably secured to the Geiger-Müller tube to permit relative movement of the latter over the scale for measuring angles of reflection of the reflected beam from the specimen.

WILLIAM PARRISH.
EDWARD A. HAMACHER.

REFERENCES CITED

The following references are of record in the file of this patent:

UNITED STATES PATENTS

| Number | Name | Date |
|---|---|---|
| 1,164,987 | Bucky | Dec. 21, 1915 |
| 1,589,833 | Behnken et al. | June 22, 1926 |
| 2,011,540 | Lee | Aug. 13, 1935 |
| 2,331,586 | Waisco | Oct. 12, 1943 |
| 2,386,785 | Friedman | Oct. 16, 1945 |

FOREIGN PATENTS

| Number | Country | Date |
|---|---|---|
| 670,322 | Germany | Jan. 16, 1939 |

OTHER REFERENCES

Focusing X-Ray Monochromators by C. S. Smith, Review of Scientific Instruments, June 1941, pp. 312–314.

Scattering of X-Rays from Gases by E. O. Wollan, Physical Review, Apr. 1931, pp. 862–872.

A New Precision X-Ray Spectrometer by W. Soller, Physical Review, Aug. 1924, pp. 158–167.

"The New X-Ray 'Microscope'" by Gaylord Johnson, from the Scientific American, May 1932, pp. 278–282.